United States Patent
Hölzel et al.

(10) Patent No.: US 7,648,357 B2
(45) Date of Patent: Jan. 19, 2010

(54) EXTRUDER

(75) Inventors: Maria Hölzel, Ditzingen (DE); Dirk Kyrion, Sternenfels (DE)

(73) Assignee: Coperion GmbH, Stuttgart (DE)

( * ) Notice: Subject to any disclaimer, the term of this patent is extended or adjusted under 35 U.S.C. 154(b) by 16 days.

(21) Appl. No.: 11/957,434

(22) Filed: Dec. 15, 2007

(65) Prior Publication Data
US 2008/0254158 A1    Oct. 16, 2008

(30) Foreign Application Priority Data
Dec. 22, 2006    (EP)    .................................. 06026662

(51) Int. Cl.
*B29C 47/62* (2006.01)
*B29C 47/64* (2006.01)
(52) U.S. Cl. ........................ 425/202; 425/204; 425/208; 425/382.3; 425/464
(58) Field of Classification Search ................ 425/202, 425/204, 208, 382.2, 382.3, 464
See application file for complete search history.

(56) References Cited

U.S. PATENT DOCUMENTS

| | | | |
|---|---|---|---|
| 2,291,212 A | 7/1942 | Clinefelter | |
| 2,488,129 A | 11/1949 | Lande, Jr. | |
| 2,583,600 A | 1/1952 | Schreiber | |
| 3,018,516 A | 1/1962 | Clinefelter | |
| 3,108,516 A | 10/1963 | Elam | |
| 3,536,115 A * | 10/1970 | Weiler | .................. 241/82.5 |
| 3,847,360 A * | 11/1974 | Seydelmann | ................ 241/82.5 |
| 3,901,486 A | 8/1975 | Matsui | |
| 3,976,799 A | 8/1976 | Kelly, Jr. et al. | |
| 4,057,379 A | 11/1977 | Sato | |

FOREIGN PATENT DOCUMENTS

| | | |
|---|---|---|
| CH | 615 384 | 1/1980 |
| EP | 1 037 703 | 9/2000 |
| FR | 1 206 465 | 2/1960 |
| FR | 2 322 719 | 4/1977 |
| GB | 1 564 410 | 4/1980 |
| JP | 54 040864 | 3/1979 |
| JP | 55 057444 | 4/1980 |
| JP | 55 159954 | 12/1980 |
| JP | 57 070628 | 5/1982 |
| SU | 925 654 | 5/1982 |

OTHER PUBLICATIONS

Statement about previously cited references EP 1037703, JP 570628 and CH 615384 (2 pages), Jul. 29, 2009.
European Search Report EP 06 02 6662 dated May 4, 2007 (4 pages).

* cited by examiner

*Primary Examiner*—Robert B Davis
*Assistant Examiner*—Joseph Leyson
(74) *Attorney, Agent, or Firm*—James B. Conte

(57)    ABSTRACT

An extruder has a casing with at least one bore. One screw each is arranged in the bore in a rotatably drivable manner and is provided with a screw tip adjoining a nozzle plate. A shearing tool is arranged at the screw tip directly in front of the nozzle plate and is provided with at least one arm, with a shearing gap being formed between said arm and the nozzle plate.

4 Claims, 6 Drawing Sheets

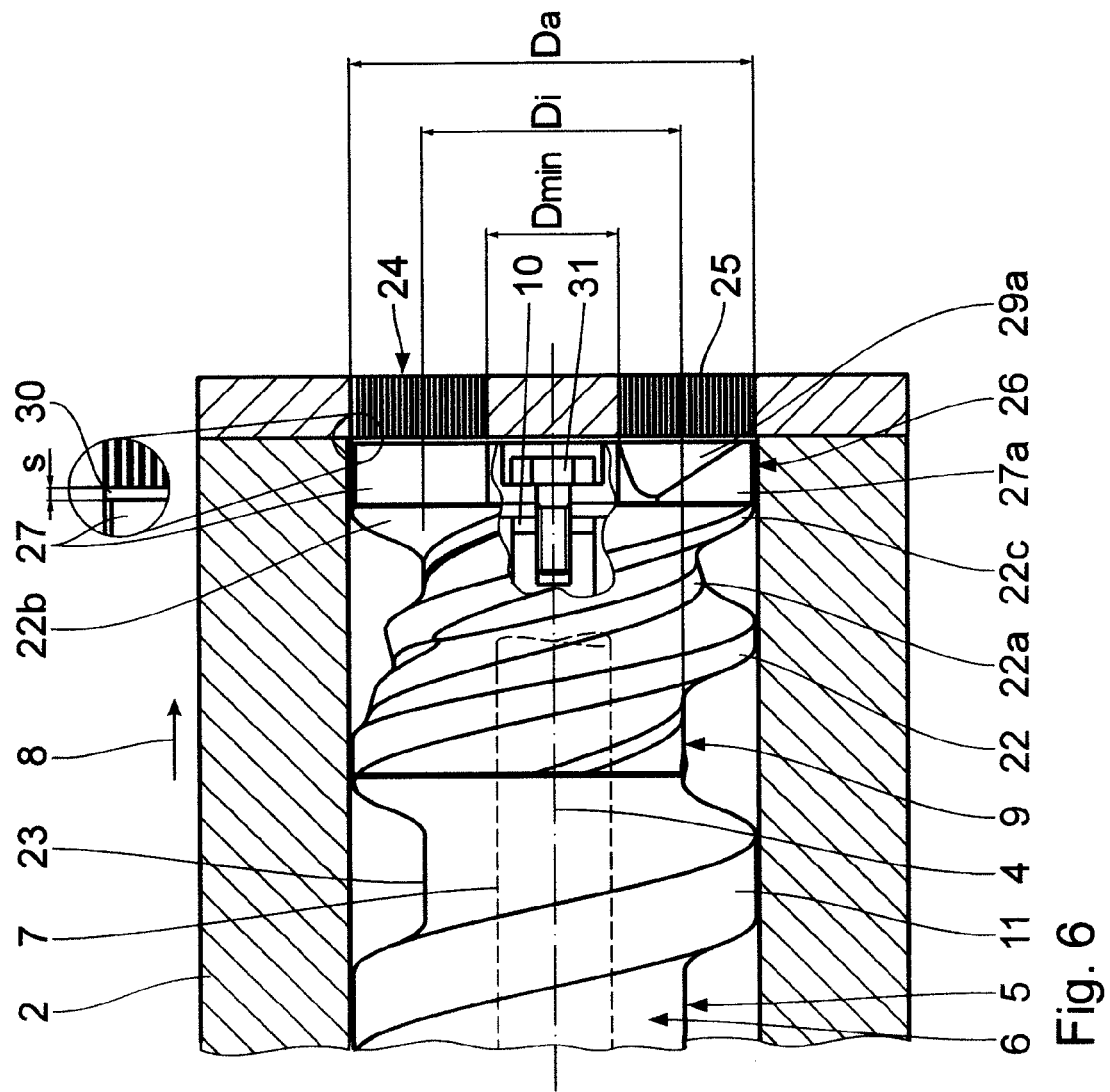

EXTRUDER

BACKGROUND OF THE INVENTION

1. Field of the Invention

The invention relates to an extruder comprising a casing, at least one bore which is formed in the casing and has a diameter Da, at least one screw which is arranged in the bore in a rotatably drivable manner and has a screw tip arranged at the downstream end—in relation to a direction of flow—said screw tip again being provided with a screw stem having a diameter Di and at least one screw flight, a nozzle plate which is arranged downstream of and adjacent to the screw tip so as to close the at least one bore, and is provided with a plurality of nozzle holes which is formed on an annular surface of the nozzle plate.

2. Background Art

In such an extruder known from EP 1 037 703 B1, a stripper device which is elastically supported in the direction of the axis is attached to the down-stream end of the screw, said stripper device bearing against the inner side of the nozzle plate facing the bore and stripping off material to be conveyed. This embodiment is to be used for conveying polymer pellets containing active ingredients which may be pharmaceutical products, plant protection products, feed additives and food additives.

A screw-type machine which is provided with a stripper bearing against the nozzle plate in an elastic manner is known from U.S. Pat. No. 3,976,799. This screw-type machine serves for the extrusion of food and the like.

A screw-type machine which is provided with a nozzle plate stripped by means of an axially immovable stripper is known from U.S. Pat. No. 2,583,600. This screw-type machine also serves for the treatment of food.

A screw-type machine having a nozzle plate with knives bearing against the inner side thereof, said knives being pressed against the nozzle plate by the material pressure, is known from CH 515 384 A5. The function of these knives, which are pressed against the nozzle plate, is to create predetermined breaking points in the individual strands of material which are created in each nozzle hole, ensuring that the individual strand of material breaks off after leaving the nozzle plate.

These embodiments are not suitable for the extrusion of materials which are capable of flowing only if a substantial amount of shearing action is provided. Such materials are in particular Bingham media where the material does not start to flow until the flow limit, i.e. a particular shear stress, is exceeded. Such materials are for example plastic ceramic compounds, colloidal dispersions, slurries of glass beads, etc.

SUMMARY OF THE INVENTION

It is the object of the invention to develop an extruder in a way as to allow for materials which are virtually incapable of flowing to be extruded through a nozzle plate.

This object is achieved in accordance with the invention by arranging a shearing tool having at least one arm at the screw tip directly in front of the nozzle plate, with a shearing gap being formed between said shearing tool and the nozzle plate, wherein the shearing gap has a gap width s with $1.0 \text{ mm} \leq s \leq 3.0 \text{ mm}$.

By arranging shearing tools in front of the nozzle plate and with a small gap between the shearing tools and the nozzle plate, the material to be extruded is once again subject to a very high degree of shearing directly in front of the nozzle plate, thus enabling it to flow. This suffices for the material to be extruded through the nozzle plate. It does not matter if it is no longer capable of flowing upon leaving the nozzle plate.

By the development in which the shearing tool is provided with a number of arms which equals a number of screw flights of the screw tip, said arms being attached to a hub having a diameter Dmin to which applies Dmin<Di, the material flow, on its way from the screw tip to the shearing tool, is subject to an optimal amount of shearing. Moreover, in connection with the measures by means of which the at least one arm has a surface conveying material towards the hub, it is obtained that the cross-sectional area of the bore, where a dead-space free, i.e. active displacement, takes place, becomes very large. This space is not confined to the area between the screw stem and the outer diameter of the screw flights or the inner wall of the bore, respectively, but also extends radially inwards from the screw stem. By the development in which the at least one arm has a surface leading towards the shearing gap, the shearing effect is particularly optimized. The development in which the at least one arm is arranged congruently and superimposed with the downstream end of the at least one screw flight of the screw tip enables the material to flow from the screw tip to the shearing gap without disturbances.

Further advantages, features and details of the invention will become apparent from the ensuing description of exemplified embodiments of the invention, taken in conjunction with the drawing.

BRIEF DESCRIPTION OF THE DRAWINGS

FIG. 6 shows a section according to FIG. 4 of the modified embodiment but corresponding to the section line IV-IV in FIG. 5.

DESCRIPTION OF THE PREFERRED EMBODIMENT

Figure 1:
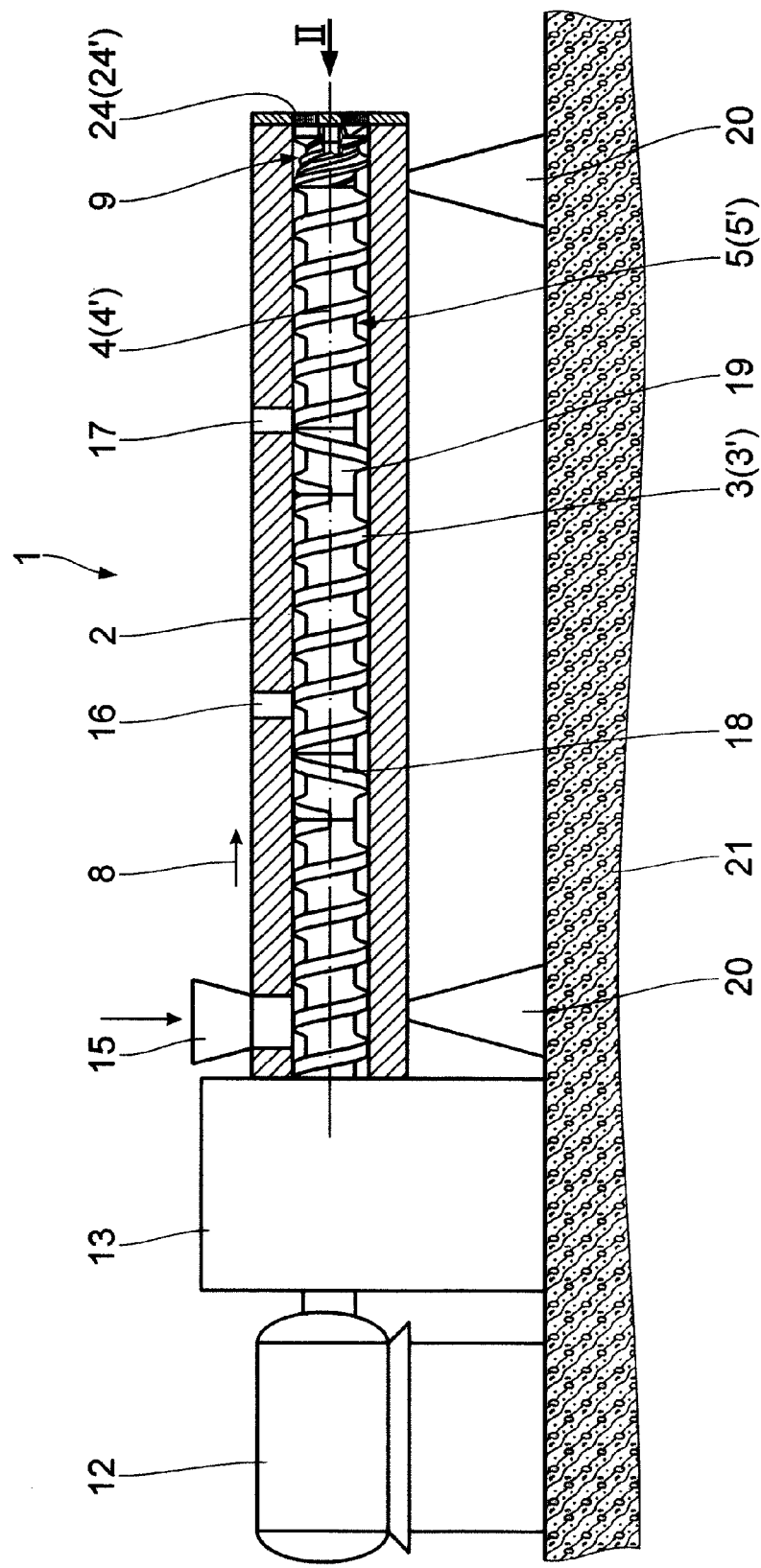
FIG. 1 shows a schematic longitudinal section of an extruder.

An extruder 1, the basic structure of which is designed in the usual manner, is provided with a casing 2 in which two bores 3, 3' having parallel axes 4, 4' are formed, said bores 3, 3' inter-engaging in a figure-eight-type manner. In the bores 3, 3', screws 5, 5' are arranged which are composed of individual screw elements 6, 6' and, if necessary, kneading elements and the like which are not shown here. The screw elements 6, 6' are arranged on toothed shafts 7, which are only indicated, in a rotationally fixed manner. Each of the last screw elements 6, 6' in the direction of flow 8 is a so-called screw tip 9, 9'. All screw elements 6, 6', including the screw tip 9, 9', are clamped on the respective toothed shaft 7 in the direction of the respective axis 4, 4' by means of a clamping screw 10, 10'.

The screws 5, 5' are configured in a closely intermeshing manner, i.e. with inter-engaging screw stems 11. The screws 5, 5' are driven by an electric motor 12 connected to a reduction and distribution gearbox 13, with the casing 2 also being flange-mounted thereto. The screws 5, 5' are driven in the same direction, i.e. their direction of rotation 14 is the same.

In a position adjacent to the gearbox 13, i.e. at the upstream end of the extruder 1, a feeding funnel 15 projects into the casing 2. Degassing openings 16, 17 projecting out of the casing 2 may be provided behind the funnel 15 in the direction of flow 8 and may, for example, be connected to a vacuum pump not shown. Retaining devices 18, 19 in the shape of screw elements conveying in a direction counter to the direction of flow 8 may also be provided. Moreover, as already mentioned, kneading elements may be provided.

The casing 2 is supported on a foundation 21 by means of columns 20.

The screw elements 6, 6' arranged in front of the screw tips 9, 9—in relation to the direction of flow 8—have a single flight, while the screw tips 9, 9' have two screw stems 22, 22a and are thus are provided with a double flight. The stem diameter Di of the screw elements 6, 6' and the screw tips 9, 9' is constant over the entire length. In contrast, however, the external diameter Da of the screw elements 6, 6' is constant over the length of the casing 2. In practice, it is configured in a way as to equal the diameter of the bores 3, 3'. The screw stems 22, 22a of the screw tips 9, 9' taper down towards the stem diameter Di in the direction of flow 8, i.e. they taper off in the screw stem 23. Seen in the direction of flow 8, the last screw-stem half 22b, 22c, which equals the stem diameter Di, increases again until it equals the external diameter Da.

The bores 3, 3' of the casing are closed by nozzles in the shape of one nozzle plate 24, 24' each which are provided with a plurality of nozzle holes 25. A shearing tool 26 or 26', respectively, is arranged between each last screw stem 22b or 22c, respectively, and the respective nozzle plate 24, 24', said shearing tool 26, 26' being configured in a wing-like design. The two wings or arms, respectively, 27, 27a are disposed in a diametrical arrangement. They extend outwards from a hub 28 in a substantially radial manner. The diameter Dmin of this hub 28 is considerably smaller than the stem diameter Di of the screw stem 23. On their front side, when seen in the direction of rotation 14, the arms 27, 27a of the shearing tools 26, 26' are provided with a conveying surface 29, 29a which is inclined backwards towards the respective axis 4 or 4', respectively, in relation to the direction of rotation 14, thus exerting a radial displacement effect in the direction of the hub 28 on a material to be conveyed. Moreover, the conveying surfaces 29, 29a are inclined backwards—in relation to the direction of rotation 14—towards the nozzle plate 24 or 24', respectively, in a way that the conveyed material is fed into a shearing gap 30 which is formed between the arms 27, 27a and the facing side of the nozzle plate 24 or 24', respectively, and has a gap width s in the direction of the axes 4, 4' to which applies: $1 \text{ mm} \leq s \leq 3 \text{ mm}$.

The nozzle holes 25 are arranged on the nozzle plates 24, 24' over the entire annular surface which is confined by the hub diameter Dmin and the external diameter Da. The surface of the nozzle plates 24, 24', which is confined by nozzle holes 25, thus extends beyond the stem diameter Di and inwards towards the axis 4 or 4', respectively.

Figure 2:
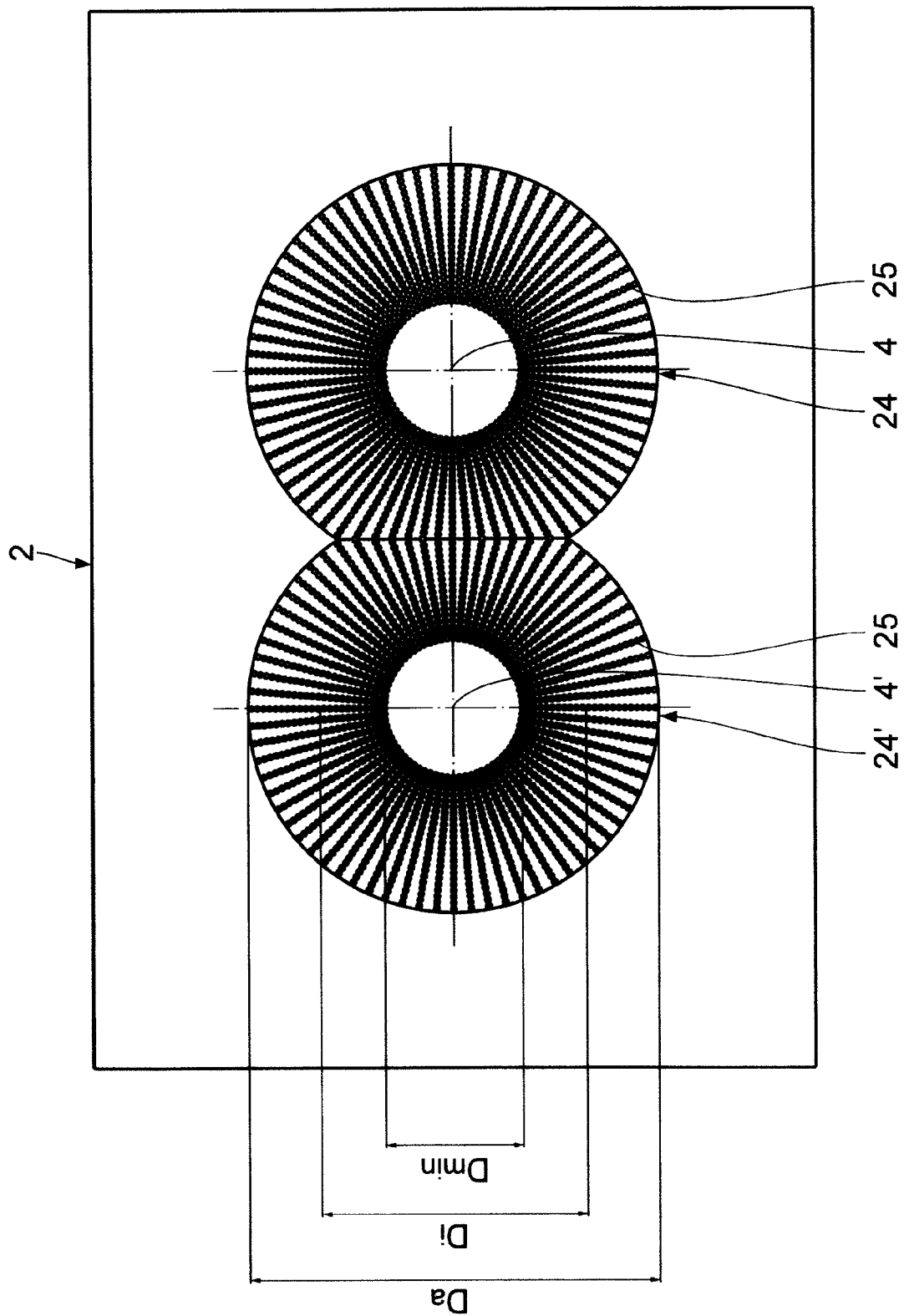
FIG. 2 shows a front view of the extruder corresponding to the arrow II in FIG. 1.
Figure 3:
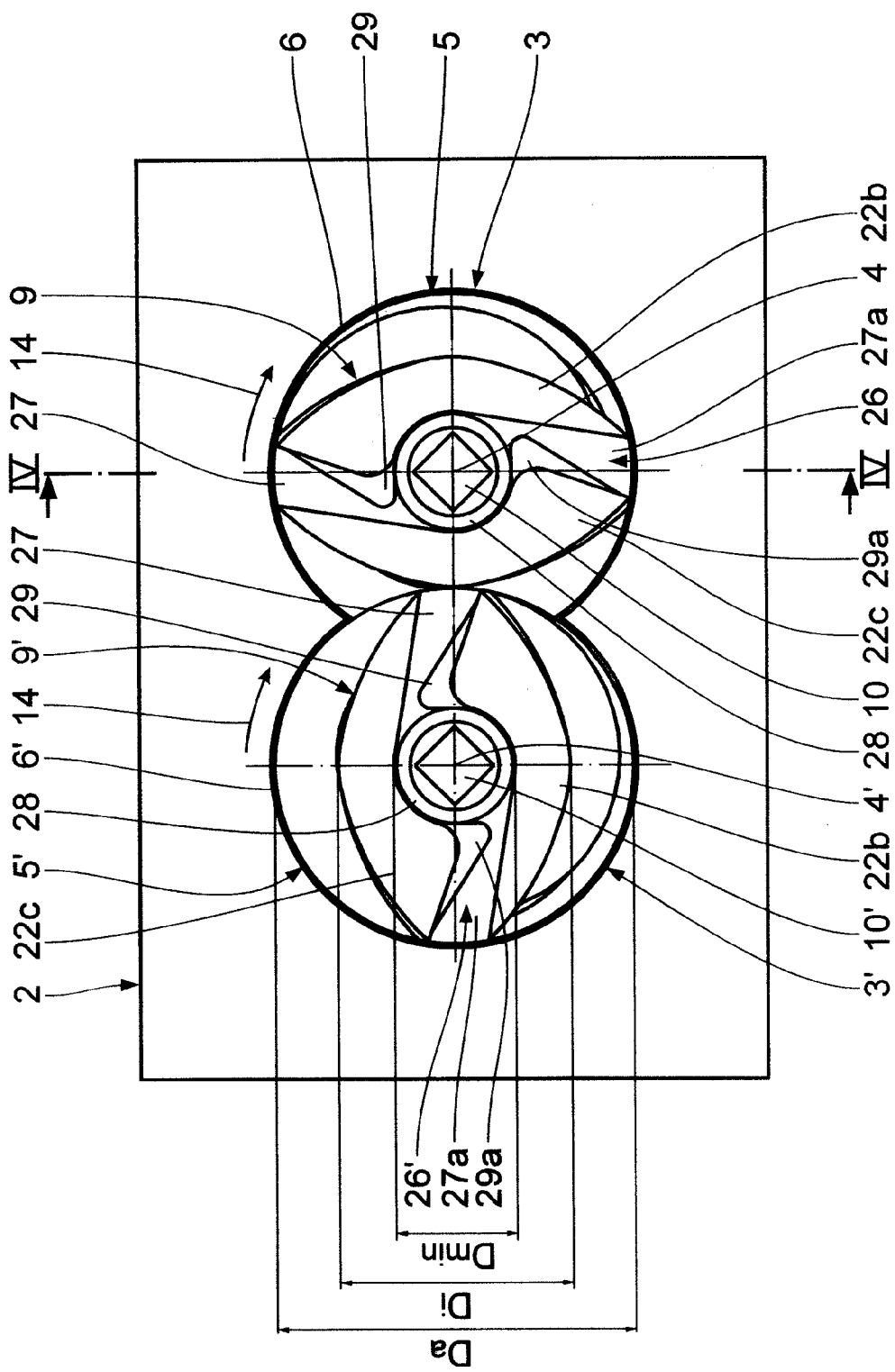
FIG. 3 shows a front view of the extruder according to the arrow II in FIG. 1 with the nozzle plate removed.
Figure 4:
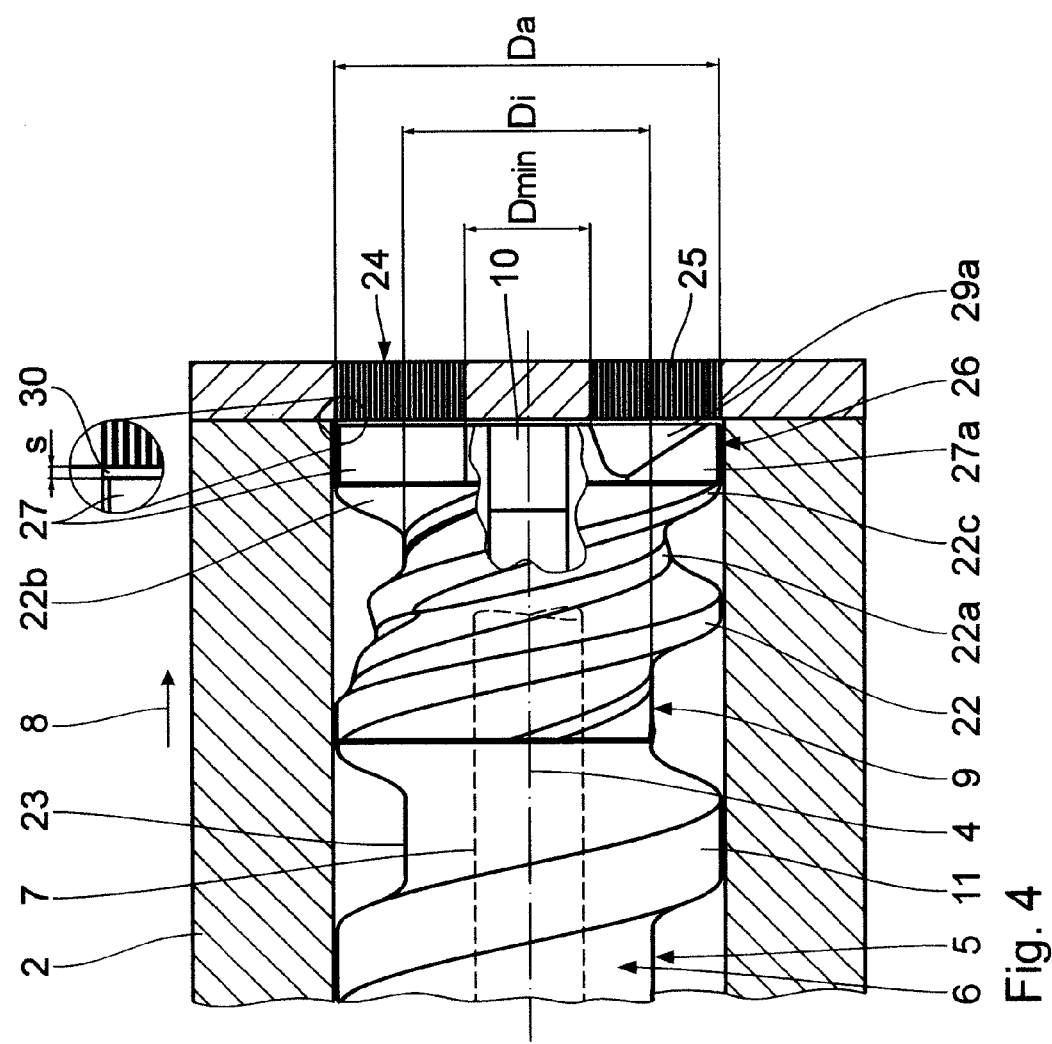
FIG. 4 shows a partial longitudinal section of the extruder corresponding to the section line IV-IV in FIG. 3.
Figure 5:
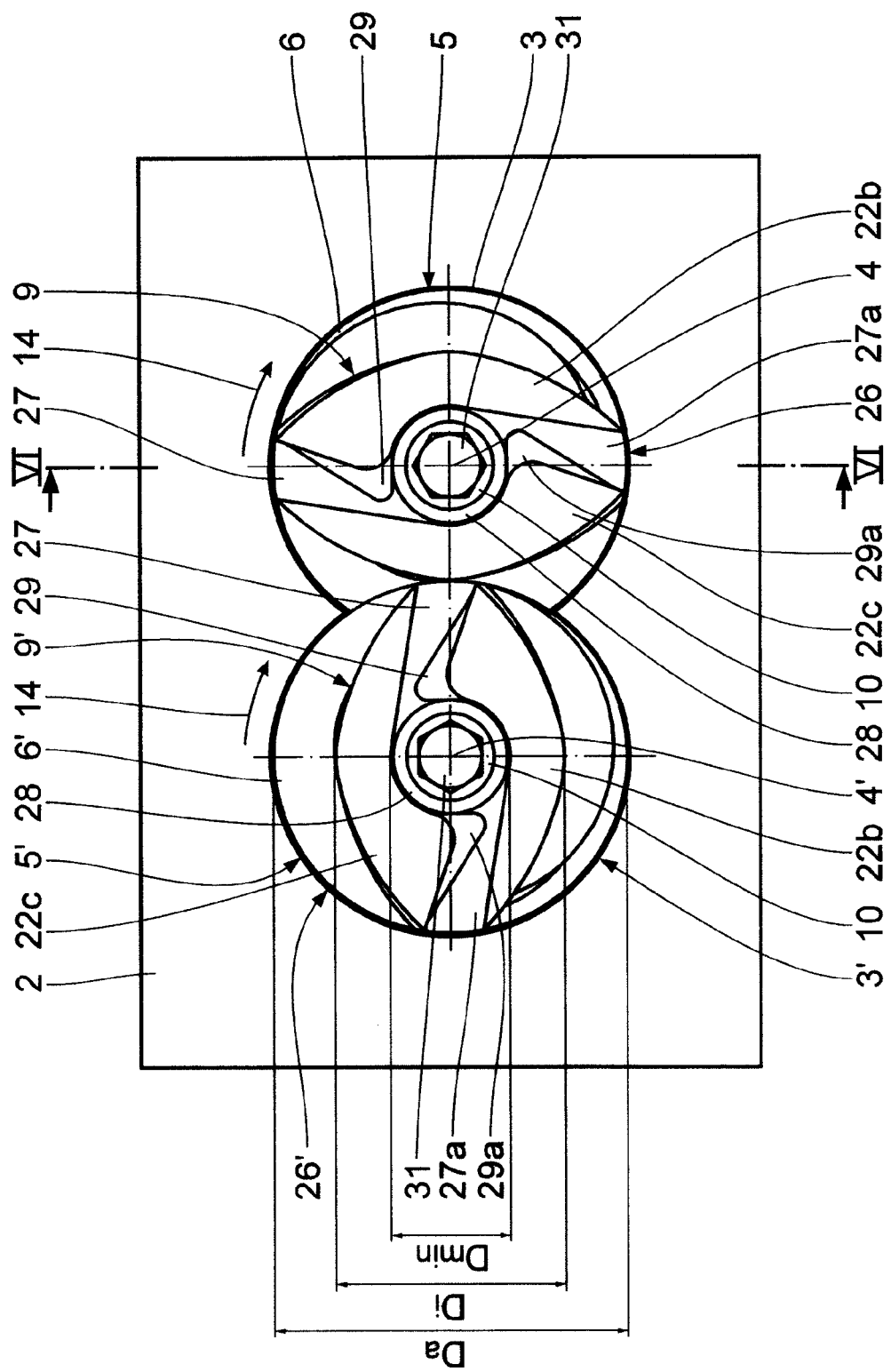
FIG. 5 shows a front view corresponding to FIG. 3 of a modified embodiment.

In the embodiment according to the FIGS. 2 and 3, each of the shearing tools 26 or 26', respectively, forms a single part and is thus integral with the adjacent screw tip 9, 9'. In the embodiment according to the FIGS. 4 and 5, the shearing tool 26, 26' is configured as an individual component and is fastened to the clamping screw 10 by means of a screw 31.

What is claimed is:

1. An extruder comprising
    a casing,
    at least one bore which is formed in the casing and has a diameter Da,
    at least one screw which is arranged in each bore in a rotatably drivable manner, which is provided with single-threaded screw elements with an external diameter Da, and which has a screw tip arranged at a downstream end, in relation to a direction of flow, said screw tip in turn being provided with a screw stem having a stem diameter Di,
    a nozzle plate which is arranged downstream of and adjacent to the screw tip so as to close the at least one bore, which is provided with a plurality of nozzle holes, and which is formed on an annular surface of the nozzle plate,
    wherein the screw tip is double-threaded with two screw flights which taper in the direction of flow down to the stem diameter Di, wherein the last half screw flight of each screw flight increases in each case in the direction of flow until the external diameter Da is reached,
    wherein a shearing tool is arranged at the screw tip directly in front of the nozzle plate,
    wherein the shearing tool has two arms which are in each case arranged superimposed with the downstream end of the respective screw flight of the screw tip and are attached to a hub, wherein to a diameter Dmin of the hub applies: Dmin<Di, and
    wherein a shearing gap with a gap width s is formed between said shearing tool and the nozzle plate, wherein to the gap width s applies: $1.0 \leq s \leq 3.0 \text{ mm}$.

2. An extruder of claim 1,
    wherein at least one of the arms has a surface conveying material towards the hub.

3. An extruder of claim 1,
    wherein at least one of the arms has a surface leading towards the shearing gap.

4. An extruder of claim 1,
    wherein the nozzle holes are arranged on the annular surface having an internal diameter Dmin and an external diameter Da.

* * * * *